United States Patent [19]

Bertram

[11] Patent Number: 5,389,692
[45] Date of Patent: Feb. 14, 1995

[54] STRUCTURAL STRENGTH COATING AND MATERIAL

[76] Inventor: Richard L. Bertram, 8577 Wonderland Ave., Hollywood, Calif. 90046

[21] Appl. No.: 112,586

[22] Filed: Aug. 25, 1993

Related U.S. Application Data

[63] Continuation-in-part of Ser. No. 966,282, Oct. 26, 1992, Pat. No. 5,268,392.

[51] Int. Cl.$^6$ .............................................. C08L 75/00
[52] U.S. Cl. ....................................... 521/51; 521/132; 521/112; 521/170; 521/905; 524/730; 524/731; 524/839; 428/36.5; 428/160; 428/304.4; 428/314.4
[58] Field of Search ................ 521/51, 132, 112, 170, 521/905; 524/730, 731, 839; 428/36.5, 160, 304.4, 314.4, 318.8, 425.5

[56] References Cited

U.S. PATENT DOCUMENTS 4,792,493  12/1988  Bertram et al. ...................... 428/911

Primary Examiner—Maurice J. Welsh
Attorney, Agent, or Firm—Thomas A. Turner, Jr.

[57] ABSTRACT

A co-polymer composition for coating porous structural material includes a compatible surfactant resulting in a structural inter-bonding between the coating composition and the structural material. The co-polymer composition cured in a layer of unsupported foam has sufficient strength to be used as a substitute for comparably or larger sized layers of re-enforced concrete for conducting fluids while resisting compressive loads. A co-polymer foam composition for coating structural material cures to have an atmosphere-facing surface that is substantially impervious to corrosive substance penetration.

25 Claims, 4 Drawing Sheets

STRUCTURAL STRENGTH COATING AND MATERIAL

CONTINUATION-IN-PART APPLICATION

This application is a continuation-in-part of application Ser. No. 966,282, filed Oct. 26, 1992, and now U.S. Pat. No. 5,268,392, in the name of Richard L. Bertram, Applicant herein, for "Deteriorated Structure Repair Method and Substratum for Restoring and Lining Corroded Structure," priority of filing date for all subject matter common to this and said parent applications being hereby claimed.

BACKGROUND OF THE INVENTION

1. Field of the Invention

The present invention relates to the art of fluid conduits, and more particularly to the application of polymer substances to restore, strengthen and substitute for deteriorated and new concrete or metal structures that have to resist corrosion.

2. Description of the Prior Art

Waste water and sewerage are frequently conducted through fluid conduits made of concrete. In some applications, the conduits are made of metal. Sewer systems frequently have reservoirs, containers and ponds, such as settling ponds which also are made of concrete and sometimes of metal. Sewerage and waste water often contain material that is highly corrosive, especially with respect to concrete and metal. The closed system which constitutes most sewerage systems in use presently, creates anaerobic conditions ideal for the proliferation of anaerobic bacteriae which result in hydrogen sulfide. Consequently, waste water pipes, sewage pipes, reservoirs, containers and ponds frequently are the subject of substantial corrosion and deterioration. In addition, corrosive material resulting from the digestive by-products of organisms existing within the waste water and sewer systems cause substantial deterioration of the concrete and metal conduits.

Here in this specification for simplicity of explanation, reference will often be made to "conduits" and "pipes," by which terms I intend to include not only conduits and pipes but also box tunnels and culverts, reservoirs, containers and ponds as discussed above. Such "conduits" and "pipes" as those terms are used herein, include, for example, settling or processing "ponds" at sewerage processing plants, back-up reservoirs and, in general, building structures involved with such processing, unless the text specifies otherwise.

The deterioration frequently takes the form of physical decay of the walls of the conduits so that the thickness of the walls is reduced. Actual amounts of the concrete or metal are literally removed or corroded away over the years. In many instances, sewer and waste water conduits and like structures have walls so thin that the conduits have collapsed under the weight of traffic passing over them, and it has been reported that people have stuck their arms through them with relative ease.

Another undesirable effect of the corrosion and deterioration is that in the weakened condition that thin walls have, the walls crack more easily, resulting in leaks in the sewer system. Such leaks undermine the soil or prepared beds in which the concrete or metal pipes lay. Further, such leaks may contaminate the aquifer, may pollute the water ways and may surface to make the environment above unpleasant, as well.

Some of the more common corrosive materials within sewer conduits are sulfuric acid and hydrogen sulfide, which can turn into sulfuric acid under the conditions frequently found in sewer systems. Their corrosive effects may be readily appreciated. Sewer conduits normally have an anaerobic slime deposit along the wall of the conduit which is submerged below the liquid line or level. Various metal sulfates are among the more common ingredients of this anaerobic deposit. In the substantially liquid waste water, the sulfates reduce to sulfide ions, which combine with the hydrogen in the waste water to outgas above the liquid level as hydrogen sulfide.

Hydrogen sulfide, per se, can be highly corrosive to metals, of which some sewer pipes are made. Many concrete pipes have metal, as, for example, steel reinforcing ribs, beams and like support structure, which are sometimes called "rebar."

Oxygen from the air intakes in the sewer system, such as manholes, as well as oxygen from water condensing on the upper portions of the interior surface of the conduit wall which are not in contact with the liquid being conducted, interacts with bacteria within the conduit above the liquid level. The bacteria produces more hydrogen sulfide. Oxygen from the liquid and condensing from the water in the air reacts with the hydrogen sulfide gas to create the highly corrosive sulfuric acid. The hydrogen of the acid reacts with the calcium hydroxide in the cement of the concrete conduit, and calcium results as gypsum or calcium sulfate, which has been described as a soft corrosion product. The gypsum drops off the interior of the wall itself, making the wall more thin and substantially weakened. In this manner, whole chunks of the concrete wall are removed or vanish, reducing the thickness of the wall.

Restoring such damaged and weakened conduits and pipes in the past has been accomplished primarily through two fundamental methods. In one basic modality, the concrete conduits are entered and fresh concrete is troweled onto the walls to build the thickness back to the original dimension. This method is somewhat problematic in that troweling on the roof of the conduit requires special efforts and time. Frequently, such as in sewer conduits, for example, the repair must be performed within a specified time window. Usually, sewer conduits have a relatively lower flow rate or level during the hours between midnight and the normal waking hours of around seven in the morning. After the normal waking hours, most sewer conduits are so full that entry into the conduit and any repair are not possible.

A second modality involves a process of digging from the top surface down to the weakened conduit. The earth around the weakened conduit is excavated, and a layer of concrete of suitable thickness is poured around the weakened conduit to, in effect, provide a new conduit encasing the old, crumbling sewer pipe. This method has special problems, as well. For example, most such pipes are underneath roadways and streets. Excavating down to the sewer pipe requires removing the surface road or street and diverting traffic often for weeks at a time. The amount of concrete required to encase the old pipe is substantial. The manpower required for excavating, concrete pouring and road and street restoration is substantial, as well. Both in time and material, such repair or restoration is expensive, and the disruption to street traffic is costly to the public.

Other modalities exist, such as for example a method called "slip lining," in which new pipe is inserted within the old, crumbling pipe to strengthen the pipe walls. Such methods reduce the diameter of the pipe or conduit and create problems with connecting lateral pipes joined to the pipe being repaired or restored.

Many of the methods used in the past result in a restored conduit which has a surface facing the effluent made of the same material that deteriorated before. This problem has been addressed by coating or lining the interior facing surfaces after restoration of the conduit, but such liners or coatings have met with only varying levels of satisfaction. Further, many of such methods result in a concrete or metal pipe in which the restoration is rigid or brittle. The brittleness of the restoration itself may soon result in further cracking from thermal cycling and from normal as well as violent ground movement.

It has been known in the past to provide lining for the interior surfaces of such conduits and pipes. See, for example, my U.S. Pat. No. 4,792,493 issued to Vernie L. Belcher and myself. Such linings greatly enhance the ability of the conduit to resist the corrosive effects of the many acids, caustics, toxins and organic material common in waste water and sewer systems. Lining, however, is appropriate only where the fundamental integrity of the conduit wall is substantially unimpaired, and its thickness is sufficiently strong enough to contain the substances being conducted through the pipe or conduit and sufficiently strong enough to support the earth and roadway systems above it. Where the integrity of the conduit wall is diminished, restoration of the concrete or metal structure of the conduit is necessary before a lining is applied. Finally, such restoration in many cases must be accomplished within an existing sewer system essentially while the sewer system is operational. This objective requires that any solution be accomplished during short time windows.

It is desired to provide an improved conduit for fluid conduits and pipes having exposure to highly corrosive substances which is more resilient and which resists corrosion and deterioration in the first instance. It is desired to provide an improved conduit coating for restoring the interior integrity of concrete and metal conduits and pipes having exposure to highly corrosive substances. It is desired, further, to provide such a coating which, when applied, results in an improved intermaterial structural bonding with concrete or similarly porous structural material. It is desired, yet further, to provide such a coating which is integral, that is, requires an application of only one layer which, when applied, will have great resistance to such corrosive substances without the application of further lining. It is desired, still further, to provide co-polymer foam pipes which have the same strength as like or larger sized, re-enforced concrete pipe structures. It is a further desire to accomplish these objectives while providing a measure of flexibility to the structure in order to resist cracking and consequent leaks. It is greatly desired and sought to provide such structures which can be applied and cured or set within tight time windows that are available for installation.

SUMMARY

In brief, in accordance with one aspect of the present invention, compositions and methods for restoring or substituting for concrete or metal conduits, pipes and like structures are described in which a polyurethane resin is hydrogenated and applied along with an isocyanate to create a foam. In one aspect of the invention, a polyurethane coating is adapted for restoring a deteriorated concrete pipe. The polyurethane restoration is formed by a curing of the mixture of co-polymer A part and B part, having a surfactant and an amine mixed with one of the co-polymer component materials. During curing, the polyurethane component materials flow into the interstices of the concrete pores and, when the polyurethane cures, the polyurethane forms a solid intermaterial structural bonding with the coated, porous pipe. In another aspect, the polyurethane foam forms on its surface exposed to the corrosive substances, a protective surface which is substantially impervious to the corrosive substances, so that no additional lining layer having corrosive resistant characteristics is needed. In another aspect, the polyurethane is foamed to predetermined densities and formed as a fluid conduit, such as a pipe having sufficient strength to be substituted for concrete or metal pipes having the same or larger wall thickness than that of the polyurethane foam and having greater flexibility and resilience to compressive loads.

Other novel features which are believed to be characteristic of the invention, both as to organization and methods of operation, together with further objects and advantages thereof, will be better understood from the following description in which preferred embodiments of the invention are described by way of example.

DESCRIPTION OF THE PREFERRED EMBODIMENT

Figure 1:
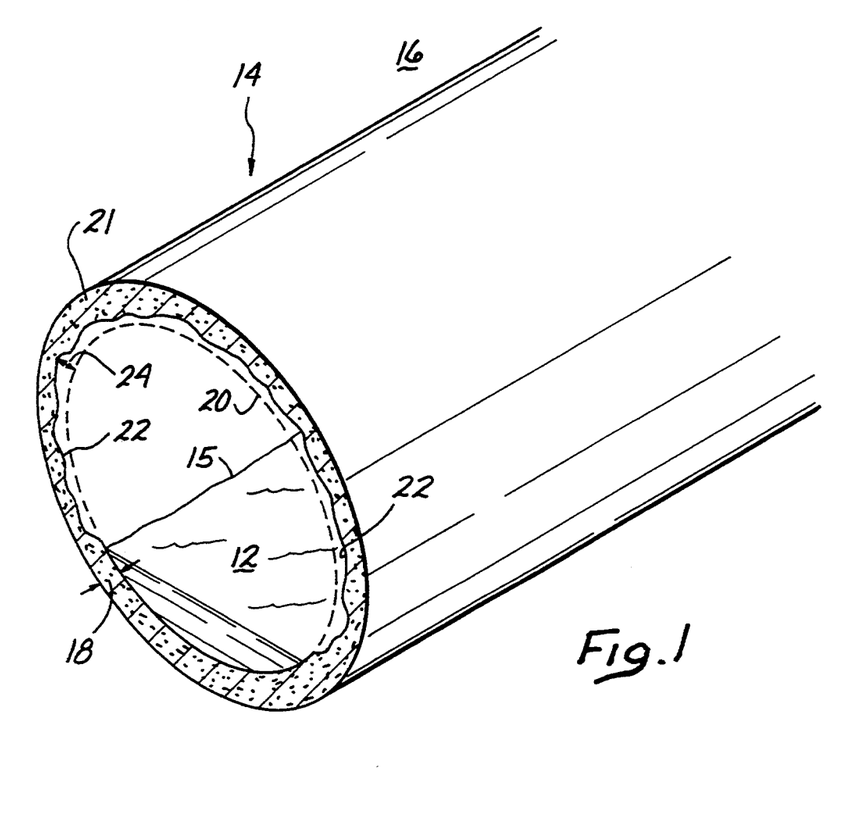
FIG. 1 is a partial perspective view with a cross-section cut away of a fluid conduit within the ground showing the deterioration thereof.

Waste water 12 is conducted normally through a concrete sewer pipe 14 positioned underneath the ground 16, frequently beneath roadways and streets, reference being had initially to FIG. 1 of the accompanying drawings. The waste water 12 has a liquid level 15 which rises and falls during the cycle of use of the sewer system. Normally, the liquid level 15 is relatively low, as shown in the accompanying FIG. 1 during the hours of from midnight to 7:00 a.m. o'clock. The level rises sharply around 7:00 a.m. o'clock and stays relatively high during the day until late in the evening hours, many times filling up the pipe 14 almost to the top most level within the pipe, sometimes called the crown of the pipe or conduit 14.

As explained above, the wall 18 of the pipe 14 is corroded primarily in those portions which are not submerged during portions of the cycle of use. The broken line 20 represents the original interior surface of the wall 18 before deterioration removed substantial portions. The interior surface 22 results after substantial portions 24 of the wall 18 are removed by the corrosion and deterioration to result in void of space 24 within the pipe where the concrete once existed.

Figures 2, 3:
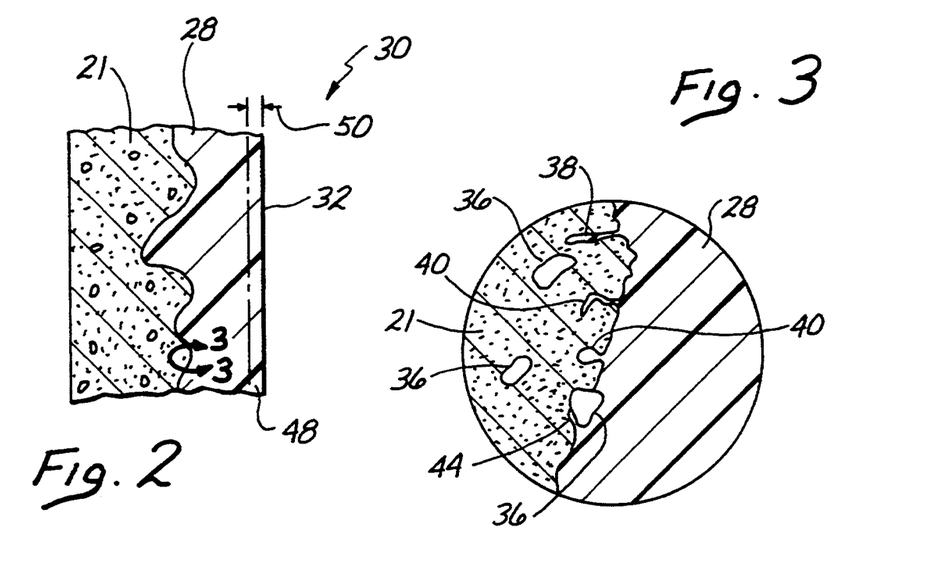
FIG. 2 is a cross-sectional view of a conduit within the ground showing the preferred embodiment of the present invention having restoration and the formation of a skin surface.
FIG. 3 is a cross-sectional, partially cut-away view taken along line 3—3 of FIG. 2 and greatly magnified, showing the bonding between the component materials of the preferred embodiment.

The thickness of the wall 18 is built up in the preferred embodiment of the present invention by applying a foam substratum 28 to the exposed surface 22 of the corroded concrete 21 of the wall 18, referring now to FIG. 2 of the accompanying drawings. In one embodiment, the foam is made from a polyurethane resin and an isocyanate. The polyurethane resin is hydrogenated with water to provide the foaming capability. The foaming component is sometimes called a blowing agent. The polyurethane resin contains a thixotropic amine in an amount sufficient to provide an adequate vertical hold when applied to the concrete surface. A suitable but powerful surfactant is added to control cell size and structure, and to wet the surface of the concrete substrate as the polyurethane foam is curing. Suitable surfactants that accomplish these objectives have been found to be:

where x and y represent the number of the indicated expression added to the chain to increase viscosity as may be desired, and where m and n are multipliers for the hydrophilic propylene and ethylene oxides selected to increase the hydrophilic-to-lipophilic balance (HBL). An HBL of 13.18 has been found to be best.

It is believed that for optimum restoration, the cell structure should be comprised mostly of closed cells of small size.

Only so much water is used in the hydrogenation in order to result in a polyurethane foam having a density of at least ten pounds per cubic foot, but preferably in the range of from sixteen to fifty-five pounds per cubic foot. It is believed that such density provides a polyurethane foam which is sufficiently strong to restore the strength necessary for a good sewer pipe or conduit. Further, such density can be attained without sacrificing flexibility which maintains the integrity of the pipe and its restoration during thermal cycling and most ground movements. The precise amount of water is determined according to the strength and density desired in the conduit to be restored, and costs associated with the restoration.

The polyurethane foam substratum 28 can be formed on the inside, irregular surface 22 which needs restoring by forcing the hydrogenated resin through one conduit, and the isocyanate through a second, concentric conduit in a flexible hose with appropriate heating, as explained in greater detail in U.S. Pat. No. 4,792,493, the methods and means therein set forth being incorporated herein in this application as though fully set forth at length. The polyurethane foam forms a substratum 28, normally setting to a tacky consistency within one-half hour, leaving an interior facing surface 32.

As may be seen in FIG. 3 of the accompanying drawing, which is a greatly magnified, partial cut-away of the cross-sectional view taken along line 3—3 of FIG. 2, corroded concrete 21 as is depicted here, has a surface 22 that is accented by exposed aggregate 36. The concrete 21 is porous, resulting in many void spaces defining pores 38, 40 and cavities 44 depending from the surface 22. Quantities of the liquid material components comprising the polyurethane co-polymer Parts A and B that come into contact with the surfaces 22 of the concrete, flow into the interstices of the pores 38, 40 of the corroded concrete 21, and around the cavities 44 sometimes occurring around exposed aggregate. The polyurethane during curing also flows into any cracks which may have formed as a result of the corrosion. In the instance of concrete that has been re-enforced with steel rebar, and where such steel rebar has become exposed by the corrosion and deterioration, these fluid material components flow in and around the steel bars as well.

It is believed that this liquid polyurethane penetration is the result of the enhanced wetting of the concrete surface portion by the polyurethane during curing accomplished by the addition of the surfactant in the mixture, as well as by the heat generated by the exothermic reaction of the polyol and isocyanate. When the polyurethane 28 cures and sets, the polyurethane restoration 28 is integrally and structurally bonded to the concrete 21, or what was left of the concrete by this inter-material bonding, so that the strength of the resulting restored pipe 30 is substantially greater than the corroded concrete pipe 14 and even of the original, pre-deteriorated concrete pipe. In tests where the such a restored pipe 30 has been tested to failure, the restored pipe did not crack until pressures substantially exceeding the failure pressure of new concrete pipe. Moreover, even after failure of the restored concrete pipe 30, the polyurethane coating 28 and concrete 21 held together. In other words, the failure occurred not along the interface between the polyurethane coating 28 and the concrete surfaces 22 to which the coating was adhered, as is reported herein below.

"Blow holes" and "pin holes" sometimes are the result of curing the polyurethane in the presence of water. It is believed that the water reacts with the isocyanate to create excessive gas, probably $CO_2$, which tends to coagulate to such dimensions that it out-gasses, creating pathways, or "holes" which remain in the cured polyurethane foam coating 28. Such pathways can and do extend from one surface to another through the entire thickness of the polyurethane foam coating 28. This result is especially encouraged where one surface abuts some material which is being coated, restricting the out-gassing to the opposite surface or surfaces, as in the environment here described. The structural result when the polyurethane cures is a blow hole or a gas pathway from the so-called coated material, such as the corroded concrete pipe 21, through the polyurethane foam coating 28 as here described to the opposite surface 32.

The conventional control of such a problem has been the elimination or restriction of water during the pre-curing procedures and during the curing process. This solution becomes merely a problem when it is desired to cure the polyurethane in an environment where water is a constant or at least is difficult to eradicate. Sewer systems would be one example of such an environment.

Such out-gassing can be controlled by the addition of a good surfactant. It has been found that the surfactant set forth herein above affords sufficient control of the gas formations in the polyurethane during the curing process so as to substantially eliminate the development of blow holes and pin holes. The surfactant should be mixed with the polyol prior to mixing with the isocyanate to form the polyurethane. It has been found that mixture of up to five percent (5%) by weight of the surfactant with the polyol gives the desired control.

It has also been found that use of such a surfactant lowers the surface tension of the polyurethane during the curing process to such an extent that the polyurethane foam coating 28 at the surface abutting the porous structural material 21 at the surface 22 will be able to enter into the porous interstices or void spaces defining the pores 38, 40 and cavities 44 of the porous material 21. Thus, concrete has a porous nature, having many small void spaces depending from its surface defining the pores of the concrete. These interstices frequently contain substantial amounts of $H_2O$ as part of the composition. Normally, such liquid increases the difficulty with which polyurethane is cured on the concrete's surfaces.

The bond that results is believed to be a mechanical bond in which the polyurethane 28 when cured interlocks with the concrete 21 which the polyurethane coats. Thus, for example, the cured polyurethane coating 28 has fingers expanding or hooking in the pores 40, and wrapping around aggregate 36 in the cavity 44, more securely holding the polyurethane coating 28 to the concrete 21. It has been observed that when it is attempted to remove the polyurethane foam coating 28 from the concrete 21, the failure occurs in the concrete 21, away from the interface 22, and not along the interface 22 itself. It is believed that the bonding permits the transfer of load from the wall 18 of the concrete pipe 21 into the coating 28, so that the coating 28 actually increases the strength of the restored concrete pipe and its wall 30 and, in those applications where the concrete pipe 30 is being restored, restores the concrete pipe 30 to better than original load bearing capacity.

The effect of the present invention, in restoring concrete pipe both in physical dimensions and in its capacity to bear loads, which is a certain measure of strength, can be better understood from the following example which is given here to aid in understanding the present invention. This example is to be understood, as are all examples given herein, as an example of one embodiment of the present invention, and is not to be taken as setting limits on the invention which is defined solely by the appended claims:

EXAMPLE I

An eight foot length of a steel reinforced concrete pipe had an original internal diameter of 24 inches and a three inch wall thickness. The internal diameter was substantially rearranged by corrosion and deterioration, with the physical shape of the cross-section looking along the shape as shown in FIG. 1 of the accompanying drawings. The wall thickness along the bottom of the cross-section, where the water remained in contact with the interior surface constantly throughout the daily cycles, remained substantially three inches. The remainder of the interior surface experienced substantial corrosion and deterioration so that the wall thickness had very substantially been reduced. In fact, at many points the steel reinforcement bars were exposed and completely shorn of any surrounding concrete. The wall thickness was measured generally at 1.75 inches. The eight foot long section was divided into two four foot sections or portions. The first section was tested as it was. A D-Load test was conducted in accordance with the specifications and instructions of the External Load Crushing Strength Test, ANSI/ASTM test C 497-75 approved Oct. 31, 1975 and published December, 1975. The first 0.01 inch crack showed at 18,000 pounds of pressure in the pressure bar. Ultimate failure occurred at 21,500 pounds of pressure. The second four foot section had its interior wall surface coated generally in accordance with the principles of the present invention. In particular, a polyurethane foam was formed according to the method and structure as set forth in my copending application Ser. No. 966,282 filed Oct. 26, 1992, but with modifications as set forth in this specification. A polyurethane resin was hydrogenated with water to provide the foaming capability. The polyurethane resin contained a thixotropic amine in an amount sufficient to provide an adequate vertical hold. A surfactant as described herein above was added not only to control cell size and structure, but also to facilitate the penetration of the polyurethane into the interstices of the porous concrete as described in this invention. Water in an amount that resulted in a density of 23 pounds per cubic foot was added. No primers were used in preparing the interior surface of the concrete pipe. The application of the foam was accomplished in an ambient temperature of 78 degrees F. A polyvinyl chloride layer of approximately 30 mils was applied to the polyurethane foam. The interior of the pipe was coated along the entire length of the four foot section, with the foam over 270 degrees of the cross-section, the bottom or lower 90 degrees not being coated. The internal diameter of the portion of the pipe coated was on the order of 22.75 inches. This second concrete pipe section or portion having the coating showed its first 0.01 inches crack at 30,000 pounds. The concrete portion of the coated pipe reached ultimate load at 39,000 pounds. Inspection after the crush at the ultimate load showed no separation of the foam from the concrete. The bond between the foam and the concrete remained.

The specification for the 24 inch internal diameter concrete pipe of the kind and length and diameter dimensions used in Example I, above, required that the pipe have less than 5% deflection and be able to withstand 12,000 pounds of pressure under the test conditions of the ASTM 497-75 test without any 0.01 inch cracks. The concrete pipe 21 having the coating 28 of the present invention realized an increase in the load bearing capability of seriously corroded pipe of 67%.

As shown in FIG. 2, the closed cell polyurethane's surface 32 which faces the interior of the conduit, and thus will be exposed to the corrosive substances flowing in the restored conduit 30, forms a skin 48 having a substantial thickness 50 sufficient to make the polyurethane foam coating 28 substantially impervious to the penetration of the corrosive substances flowing in the restored 30 conduit. This skin 48 is formed while the polyurethane is curing from the mixture of the material components comprising the A and B Parts and the surfactant. It is believed that the skin 48 is formed by cell collapse at the surface 32 and for a depth 50 depending from the surface a substantial amount. This cell collapse is enhanced by the wetting afforded by the surfactant in the polyol part of the mixture. The cellular collapse creates a surface 32 which is free of pin holes and blow holes which frequently exacerbate into sewer pipe deterioration in time. With such a surface 32, it may be unnecessary to provide a thermoplastic layer to protect the polyurethane foam coating 28 from the corrosive substances being conducted in the pipe 30 as is often generally thought to be necessary.

Figure 4:
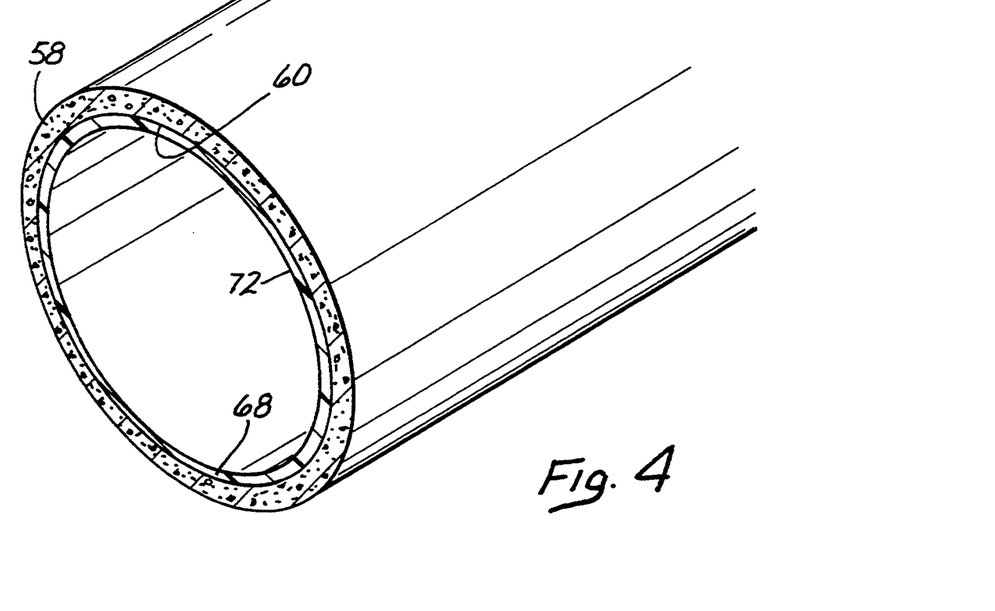
FIG. 4 is a partial perspective view with a cross-section cut away of a fluid conduit within the ground showing an alternative embodiment of the present invention.
Figures 5, 6:
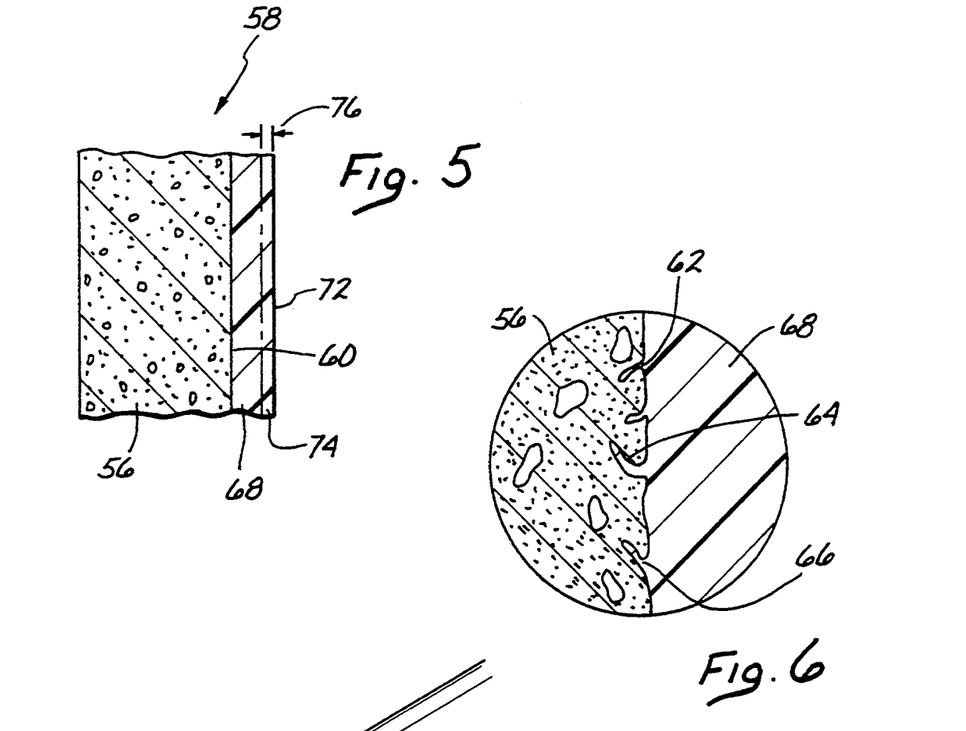
FIG. 5 is a cross-sectional view of a new, undeteriorated conduit of the alternative embodiment of FIG. 4 showing the formation of a skin surface.
FIG. 6 is a cross-sectional, partially cut-away view taken along line 6—6 of FIG. 5 and greatly magnified, showing the bonding between the materials.

As may be best seen in FIGS. 4 through 6 of the accompanying drawings, a concrete pipe 56 having a predetermined wall thickness can have its load bearing capacity significantly increased by providing the coating of the present invention. A concrete pipe 56 has a wall 58 with a thickness predetermined, by design along with the diameter, to provide a certain load bearing limit. The load bearing limit is further defined by the amount of steel or other metal reinforcement included in the pipe, as is currently common in concrete structures. The concrete pipe 56 is essentially porous, in that it has void spaces depending from surfaces, including the interior wall surface 60 and generally within the concrete as well, defining the pores 62, 64, 66.

A polyol having a suitable surfactant mixed with it, is mixed at location within the concrete pipe 56 with an isocyanate to begin the curing of the polyurethane, as a coating 68 on the interior wall surface 60 of the concrete pipe 56. The polyurethane is absorbed into the pores 62, 64, 66 depending from the surface 60 of the concrete wall 58. When the polyurethane cures, the polyurethane cured within the interstices of these pores 62, 64, 66 forms a mechanical interlock with the concrete pipe 56 effectively reinforcing the concrete pipe 56. The interlock is sufficiently effective so that the load bearing capacity of the pipe 56 is extended and transferred into the polyurethane coating 68, effectively adding additional thickness to the wall 58.

The effect of the present invention upon the capacity of pipe to bear loads, which is a certain measure of strength, can be better understood from the following example which is given here to aid in understanding the present invention. This example is to be understood as an example of one embodiment of the present invention, and is not to be taken as setting limits on the invention, which is defined solely by the appended claims:

EXAMPLE II

An eight foot length of unused steel reinforced concrete pipe having an internal diameter of 36 inches and a three inch wall thickness, was divided into two equal portions, the first being tested as it was. The second four foot portion had its interior wall surface coated in accordance with the principles of the present invention. In particular, a polyurethane foam is formed according to the method and structure as set forth in my co-pending application Ser. No. 966,282 filed Oct. 26, 1992. A polyurethane resin is hydrogenated with water to provide the foaming capability. The polyurethane resin contains a thixotropic amine in an amount sufficient to provide an adequate vertical hold. A surfactant as described herein above is added not only to control cell size and structure, but also to facilitate the penetration of the polyurethane into the interstices of the porous concrete as described in this invention. Water in an amount that resulted in a density of 23 pounds per cubic foot was added. No primers were used in preparing the interior surface of the concrete pipe. The application of the foam was accomplished in an ambient temperature of 78 degrees F. A polyvinyl chloride layer of approximately 30 mils was applied to the polyurethane foam. The overall thickness of the foam was two inches. The foam was applied around 360 degrees of the internal surface of the concrete pipe for the entire four foot length. A D-Load test was conducted in accordance with the specifications and instructions of the External Load Crushing Strength Test, ANSI/ASTM test C 497-75 approved Oct. 31, 1975 and published December, 1975. The concrete pipe without the coating of the present invention had a D-Load rating of 1,350 meaning, among other things, that the pipe specification required a loading of 16,200 pounds for the four foot length of the pipe used in this test and under the conditions of the test. The uncoated pipe showed its first crack of 0.01 inches at 22,000 pounds, and ultimate load or failure at 26,000 pounds. The concrete pipe section or portion having the coating as described showed its first 0.01 inches crack at 35,000 pounds. The concrete portion of the coated pipe reached ultimate load at 60,000 pounds. The foam coating remained uncracked at this point with less than 3.8% deflection.

As shown in FIG. 5, the closed cell polyurethane's surface 72 faces the interior of the conduit 70. As described generally above for the restorative coating, a skin 74 having a substantial thickness 76 is formed, where the thickness 76 is greater than any observed before and is sufficient to make the polyurethane foam coating 68 substantially impervious to the penetration of the corrosive substances flowing in the conduit 70. This skin 74 is formed while the polyurethane is curing from the mixture of the material components comprising the A and B Parts and the surfactant. It is believed that the skin 74 is formed by cell collapse at the surface 72 and for a depth 76 depending from the surface 72 a substantial amount. The cell collapse is enhanced by the wetting afforded by the surfactant in the polyol part of the mixture, it is believed, thus resulting in the greater and a more effective skin 74. The cellular collapse creates a surface 72 which is free of pin holes and blow holes which frequently exacerbate into sewer pipe deterioration in time. With such a surface 72, it may be unnecessary to provide a thermoplastic layer to protect the polyurethane foam coating 68 from the corrosive substances being conducted in the pipe 70 as is often generally thought to be necessary.

Figure 7:
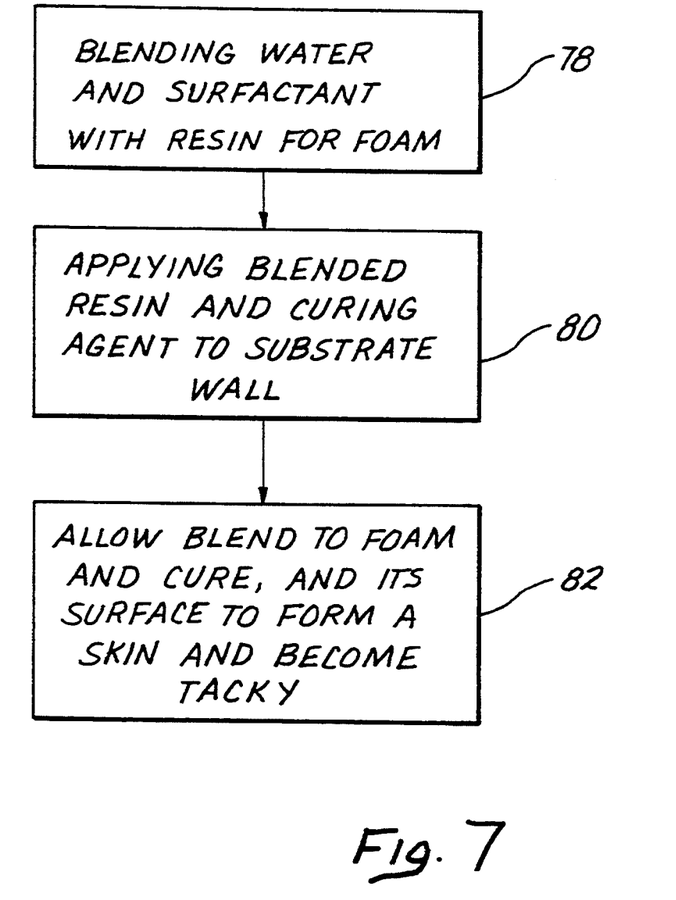
FIG. 7 is a block diagram of the method of the preferred embodiment of the present invention showing the steps thereof.

A method used for applying the foam includes the initial step of blending the polyurethane resin components, reference being had to FIG. 7 of the accompanying drawings. In the initial step 78, the surfactant and amine are blended with the resin, preferably in the presence of a catalyst such as dibutyltindilaureate, in a container having blending blades rotated at 1750 rpm for two hours or more. The catalyst is added in an amount determined by the speed with which the cure is planned to be accomplished. Adding additional catalyst will accelerate the speed of the cure process. The urethane will cure without any catalyst. The curing agent is formed by pre-polymerizing a quantity of the resin with the isocyanate to balance the volumetric ratio of resin and curing agent to a ratio of approximately 1:1. To prepolymerize, the components are blended with a mixer blade rotating at a speed of 450 rpm for approximately two hours.

The blended resin and the curing agent are transmitted through separate conduits to a nozzle at the location of application on a wall of a conduit for which it is desired to coat or restore, and are mixed and applied to the wall 80. The resin and curing agent interact to form a closed cell plastic foam, which is allowed to cure 82. In approximately twenty to thirty minutes, the foam has set to the point where the interior facing surface appears as a skin which is tacky to the touch.

Another alternative embodiment comprises the use of foamed polyurethane in accordance with the principles of the present invention as the structural material for or in place of a concrete or metal conduit or pipe. That is to say, and as seen best in FIG. 8 of the accompanying drawings, a pipe 84 made of the polyurethane as taught herein may be used as a substitute for concrete or metal pipe itself where the pipe is to be used in environments generally shielded from ultraviolet (UV) radiation. Most sewer conduits are used within the ground or in treatment facilities where much of the conduit is under some shelter from ultraviolet radiation. Where the conduit is within the ground, the conduit will be shielded from exposure to UV radiation, as will be many conduits, tanks and ponds within a treatment facility. Many such conduits, tanks, and ponds are placed within a building, are covered with some further coating such as, for example, polyvinyl chloride (PVC), or are otherwise shielded by some structure. Further, it is believed that the length of use of the polyurethane conduits will be extended where the environment has a more stable range of temperature. It is believed that the optimum temperature range for longivity of the polyurethane conduit use is from approximately 40 degrees to 70 degrees Fahrenheit. Conduits positioned within the ground generally will have an environment within a well known temperature range that is generally more stable than the atmosphere of the locality above ground.

Initially, a polyurethane resin is hydrogenated with water to provide the foaming capability. A surfactant is added to control cell size and structure, as set forth in my co-pending application Ser. No. 966,282 filed Oct. 26, 1992 and incorporated herein.

Figure 8:
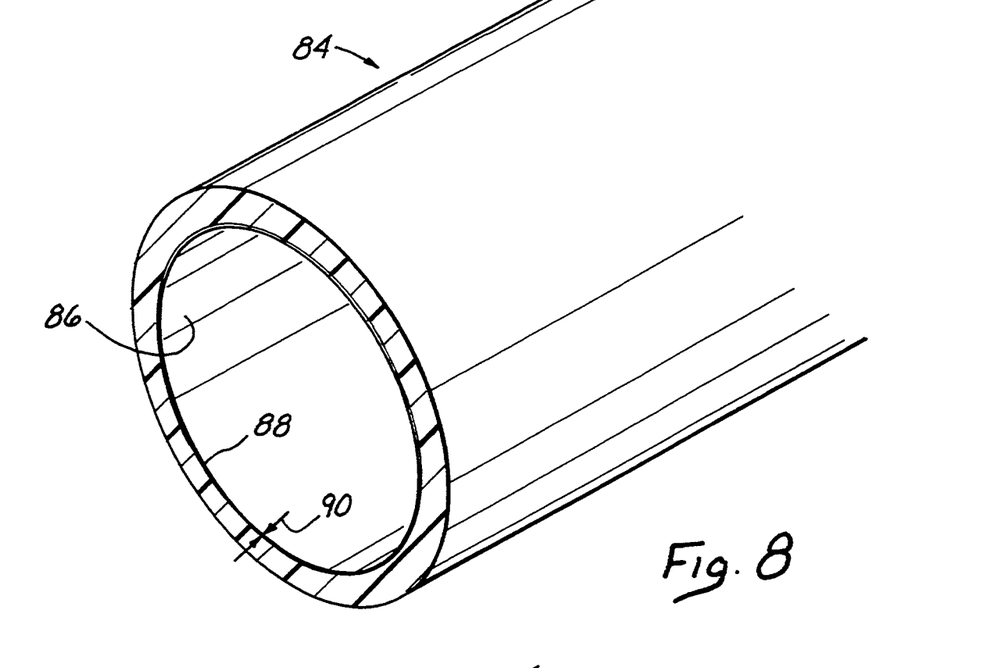
FIG. 8 is a perspective view with a cross-section cut away of yet another alternative embodiment of the present invention showing a urethane pipe; and, FIG. 9 is a perspective view with a cross-section cut away of another alternative embodiment of the present invention having a second coating.

A form is initially constructed having a distance or space between two concentric cylinders defining the thickness 90 of the pipe 84 when the polyurethane is cured within them. The polyol and isocyanate as described are inserted into the space between the cylinders and allowed to cure into a polyurethane foam pipe 84. The form is removed revealing the pipe 84 and its inner surface 86 having a thickened skin 88. The pipe 84 is ready for use.

The effect of this alternative embodiment of the present invention, in providing a substitute for concrete pipe both in physical dimensions and in capacity to bear loads can be better understood from the following example which is given here to aid in understanding this alternative embodiment. This example is to be understood as an example of one embodiment of the present invention, and is not to be taken as setting limits on the invention, which is defined solely by the claims appended:

EXAMPLE III

A form was constructed of two concentric cylinders spaced apart radially three inches to make a four and one-fourth foot (4.25') length of a polyurethane pipe having a three inch wall thickness. A wire cage made of one-fourth inch diameter steel wire conventionally used by concrete pipe manufacturers was placed in the form, in order to make a comparison between the pipe of this example with a concrete pipe constructed to meet a D-Load of 1,500 as specified by the ANSI/ASTM test C 497-75, set forth in greater detail in Examples I and II above. A polyurethane foam was formed generally according to the method as set forth in my co-pending application Ser. No. 966,282 filed Oct. 26, 1992 and incorporated herein, but with modifications as set forth in this specification. In particular, a polyurethane resin was hydrogenated with water sufficient density of 23 pounds per cubic foot. A surfactant as described herein above was added to control cell size and structure. A polyvinyl chloride layer of approximately 30 mils was positioned within the space between the inner and outer form cylinders, against the inner form cylinder so as to result in a liner on the interior surface of the polyurethane foam pipe. The Part A and Part B of the polyurethane component materials were applied into the space between the inner and outer cylinders of the form in an ambient temperature of 78 degrees F. The polyurethane was allowed to cure. The internal diameter of the pipe was 1.98 feet, or 23.75 inches. The pipe weighed only 205 pounds. This pipe was subjected to the D-Load test in accordance with the specifications and instructions of the External Load Crushing Strength Test, ANSI/ASTM test C 497-75 approved Oct. 31, 1975 and published December, 1975. A five percent (5%) deflection was observed at 24,000 pounds of pressure. The first crack did not occur until after a gauge reading of 32,500 pounds of pressure. At the pressure of cracking, the top-to-bottom measurement of the polyurethane pipe was 21 inches, and the maximum side-to-side measurement was 26 inches. After the crack was observed, the pressure was removed and the pipe returned to having a top-to-bottom dimension of 23.125 inches and a side-to-side dimension of 24.375 inches.

As may be seen from the example set forth here, the polyurethane pipe 84 constructed according to the principles of the present invention will result in a fluid conduit 84 having better strength and physical dimension characteristics than a comparably sized concrete pipe. Indeed, the pipe 84 of the present invention is substantially lighter than its concrete counterpart. The present invention provides a fluid conduit 84 which has substantially greater ability to deflect without cracking, thus reducing leaking potential and being better able to accommodate underground movement, contraction, expansion and differential pressures, such as, for example, shear forces. The pipe 84 can be advantageously used as an insert into collapsed pipe or as an insert into pipe that has so severely corroded that portions are opened to the ground or atmosphere. Thus, sections of the pipe 84 can be inserted into a formerly existing sewer which has collapsed, appropriately sealed at the ends to the remaining sewer pipe and thereby act as a replacement for the formerly existing pipe now collapsed or so far deteriorated that restoration would be deemed not productive.

Figure 9:
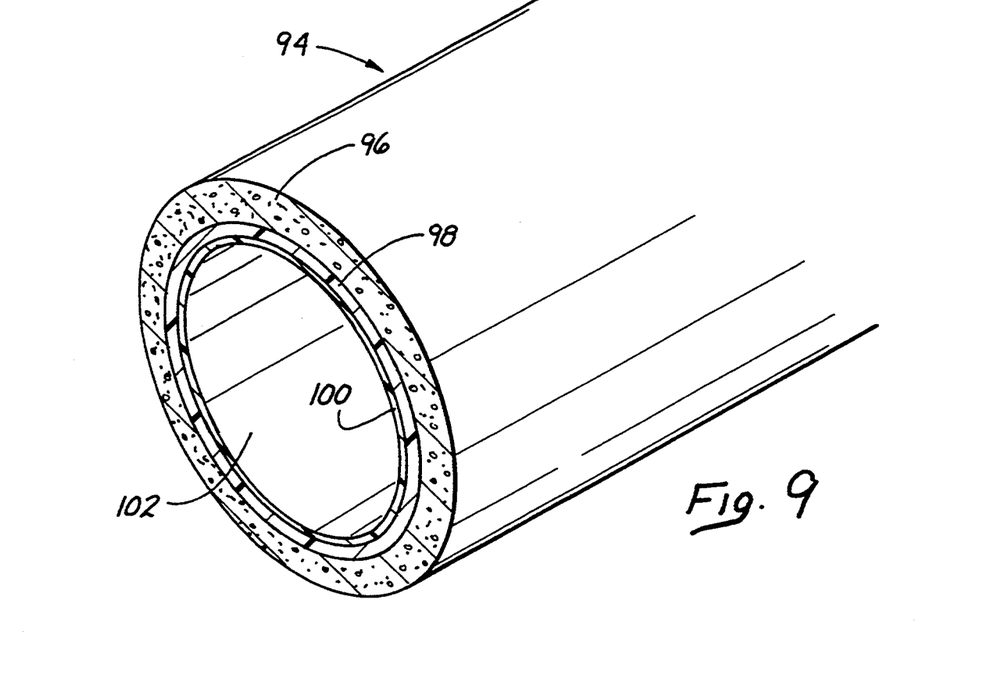

In another embodiment of the present invention, referring to FIG. 9 of the accompanying drawings, a conduit 94 is shown having a cross-section cut away for better understanding. The conduit 94 is a concrete pipe 96 having a polyurethane foam coating 98 applied in accordance with the principles described herein above. In addition, a layer of polyurethane 100 is coated onto the inner surface of the polyurethane foam coating 98, the polyurethane coating 100 having its own inner surface 102 facing the corrosive atmosphere within the conduit 94. The polyurethane coating 100 is applied by forcing the urethane resin through a flexible conduit and forcing the isocyanate through a second, concentrically arranged conduit under pressure and heat, as explained in greater detail in U.S. Pat. No. 4,792,493, the methods and procedures set forth there being incorporated here by this reference.

Thus, the polyurethane foam pipe or coating of the present invention may be enhanced by applying a layer of polyurethane, not foamed, onto the inner surface of the pipe or coating facing the corrosive atmosphere.

It may be seen that there is provided a method of restoring corroded and deteriorated concrete and metal structures, such as sewer conduits which provides strength and protection to the interior surfaces of the structures. The method describes a novel substratum, as well. It may be appreciated that such a method and substratum will provide some strength and protection at even slight densities of the foam. Further, it may be appreciated that the foam will provide a superior lining and coating arrangement, even for those structure which have not corroded, such as new installations.

The foregoing description of my invention and of preferred embodiments as to products, compositions and processes is illustrative of specific embodiments only. It is to be understood, however, that additional embodiments may be perceived by those skilled in the art. The embodiments described herein, together with those additional embodiments, are considered to be within the scope of the present invention, which is to be defined only by the appended claims.

I claim:

1. A co-polymer coating for a porous structural material having a surface and having a plurality of pores at least some of which pores open onto said surface of said porous structural material, comprising a first co-polymer component having a surfactant mixed with said first co-polymer component where the surfactant is sufficient to lower the surface tension of a co-polymer resulting from a mixture of said first co-polymer component with a second co-polymer component before said mixture has cured to form said co-polymer coating so that the co-polymer mixture occupies at least some of said pores opening onto said surface of said porous structural material.

2. The coating of claim 1 wherein said surfactant comprises up to 5% by weight of the co-polymer component with which it is mixed prior to mixing of the co-polymer components.

3. The coating of claim 1 wherein the co-polymer that results from the mixing of the co-polymer components is a polyurethane, and wherein said co-polymer component with which the surfactant is mixed is a polyol.

4. The coating of claim 3 wherein the polyurethane is not foamed.

5. The coating of claim 3 wherein the co-polymer components will mix and cure in the presence of water, and wherein the polyurethane is foamed by the addition of water.

6. The coating of claim 5 wherein a layer of non-foamed polyurethane is adhered to the foamed polyurethane coating.

7. The coating of claim 5 wherein said polyurethane foam coating has a surface opposite the porous structural material, said coating further comprising a layer of polyurethane applied to said surface.

8. The coating of claim 1 wherein the porous material comprises concrete.

9. The coating of claim 8 wherein the concrete is reenforced with steel.

10. The coating of claim 1 wherein said coating adheres to said porous material by a bond, and wherein said bond between said porous material and said coating comprises a mechanical interlock.

11. The coating of claim 10 wherein compressive load is transferred from said porous structural material to said coating.

12. A composition for mixing a polyol and an isocyanate to result when cured into a polyurethane comprising surfactant means mixed with said polyol, for lowering surface tension of said polyurethane before curing sufficiently for the polyurethane to penetrate into the pores of a porous material.

13. The composition of claim 12 wherein said polyol and said isocyanate will mix in the presence of water.

14. The composition of claim 12 wherein said surfactant is mixed in an amount of up to 5% by weight of the polyol.

15. The composition of claim 12 wherein said surfactant means includes a surfactant mixed with said polyol in an amount sufficient that surface tension of the polyurethane, when the polyol and the isocyanate are initially mixed to begin curing, increases the depth of a skin formed on any exposed surface of the polyurethane resulting from the curing of the mixture of the polyol and the isocyanate.

16. The composition of claim 12 wherein the surfactant is an hydrocarbon.

17. The composition of claim 16 wherein said surfactant comprises the chemical compound having the formula:

18. The composition of claim 16 wherein said surfactant comprises the chemical compound having the formula:

19. The composition of claim 18 wherein x, y, m and n are selected to achieve an hydrophilic to lipophilic balance of at least 13.18.

20. A polyurethane foam pipe for conducting flowing material having corrosive substances, said pipe comprising a closed cell polyurethane foam formed in a circumferentially closed, generally tubular shape comprising a wall having a thickness and a density of polyurethane foam sufficiently great that the load bearing capacity of said pipe is at least as great as a load bearing capacity of a concrete pipe having a wall with the same shape and wall thickness.

21. The closed cell polyurethane foam pipe of claim 20 wherein said density is at least twenty pounds of polyurethane foam per cubic foot.

22. The closed cell polyurethane foam pipe of claim 20 wherein said concrete pipe is reinforced with steel embedded in walls of said concrete pipe and wherein said foam pipe is reinforced with steel embedded in said wall of said foam pipe.

23. The closed cell polyurethane foam pipe of claim 20 wherein said polyurethane foam pipe wall is comprised of at least two surfaces spaced a distance apart defining said thickness, said pipe further comprises a skin formed on at least one of said wall surfaces to a depth in said thickness from said at least one surface, said skin comprising a surface substantially more impervious to corrosive deterioration from acidic sulfuric compounds.

24. The closed cell polyurethane foam pipe of claim 20 wherein said polyurethane foam pipe wall is comprised of at least two surfaces spaced a distance apart defining said thickness, said pipe further comprises a layer of polyurethane applied to at least one of said surfaces that is designed to be exposed to flowing material being conducted by said pipe.

25. The closed cell polyurethane foam pipe of claim 20 wherein said polyurethane foam pipe wall is comprised of at least two surfaces spaced a distance apart defining said thickness, said pipe further comprises a layer of polyvinyl chloride bonded to at least one of said surfaces that is designed to be exposed to flowing material being conducted by said pipe.

* * * * *